United States Patent [19]

Fujino et al.

[11] Patent Number: 5,313,462
[45] Date of Patent: May 17, 1994

[54] SYNCHRONISM ESTABLISHING METHOD AND APPARATUS

[75] Inventors: Naoji Fujino; Koji Okazaki; Mitsuru Tsuboi; Naoshi Matsuo, all of Kawasaki; Naomi Suga, Yokohama; Toshiaki Nobumoto, Fukuoka, all of Japan

[73] Assignee: Fujitsu Limited, Japan

[21] Appl. No.: 9,652

[22] Filed: Jan. 27, 1993

[30] Foreign Application Priority Data

Jan. 29, 1992 [JP] Japan .................................. 4-013663

[51] Int. Cl.⁵ .............................................. H04J 3/06
[52] U.S. Cl. .................................. 370/103; 370/105.1; 340/825.14; 358/409; 358/425
[58] Field of Search .................... 370/100.1, 103, 109, 370/110.1, 105.1; 358/409, 425, 426; 340/825.14, 825.2, 825.21; 375/107

[56] References Cited

U.S. PATENT DOCUMENTS

| | | | |
|---|---|---|---|
| 4,757,521 | 7/1988 | Korsky et al. ................ | 370/103 X |
| 5,042,028 | 8/1991 | Ogawa ......................... | 370/110.1 X |
| 5,050,005 | 9/1991 | Kagami ........................ | 370/110.1 X |

Primary Examiner—Benedict V. Safourek
Assistant Examiner—Melvin Marcelo
Attorney, Agent, or Firm—Greer, Burns & Crain, Ltd.

[57] ABSTRACT

The invention provides a synchronism establishing method and apparatus including a plurality of modules having different independent synchronization patterns to be switched wherein the switching transition process having a time length corresponding to the number of protection stages necessary for pull in and protection of synchronism is reduced so small that the presence of such switching transition process can be ignored while assuring similar advantages to those of conventional synchronism establishing apparatus. A master side module delivers a notification of establishment of synchronism thereof to a slave side module. When the slave side module is in a condition wherein synchronism is established, it puts its synchronizing operation into a waiting mode. Even if it thereafter detects a number of abnormal synchronization patterns greater than the number of protection stages, it does not determine a pull out condition and maintains the pulled in phase. If the slave side module detects a false pull out condition from the master side module, the slave side module determines that synchronism is entered therewith and resumes its processing operation.

13 Claims, 12 Drawing Sheets

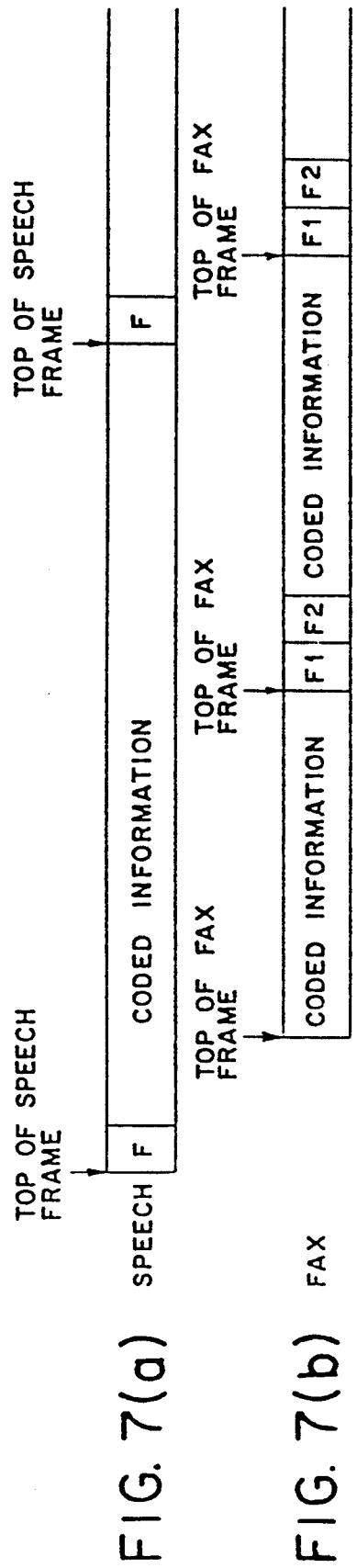

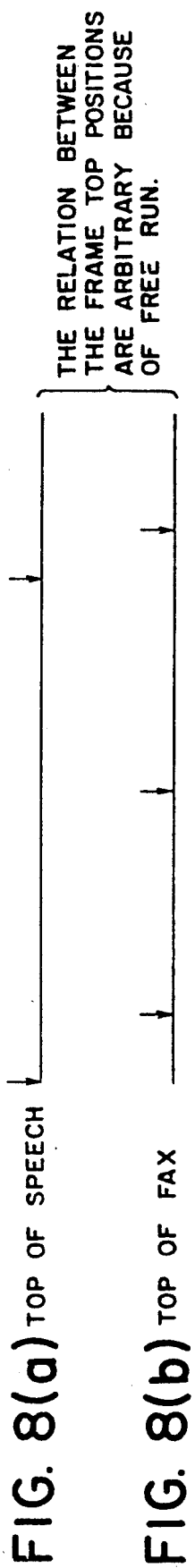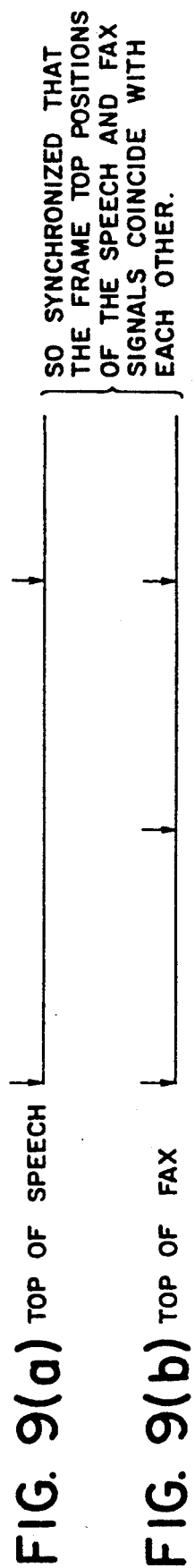

FIG.10

|  | SPEECH CODEC 2 | FAX CODEC 1 |
|---|---|---|
| FRAME PERIOD | 10 ms | 5 ms |
| FLAG PATTERN | '1','0','0','1' (1 MULTI-FRAME = 4 FRAME) ∴ 1 MF = 40ms | '10','11','00' (1 MULTI-FRAME = 3 FRAME) ∴ 1 MF = 15ms |
| PULL IN | FORWARD FOUR STAGES | FORWARD TWO STAGES |
| PULL OUT | REARWARD SEVEN STAGES | REARWARD FOUR STAGES |
| PULL IN UPON WAITING | FORWARD TWO STAGES (INCLUDING DETECTION OF STATE IN FAX MODE) | ---- |

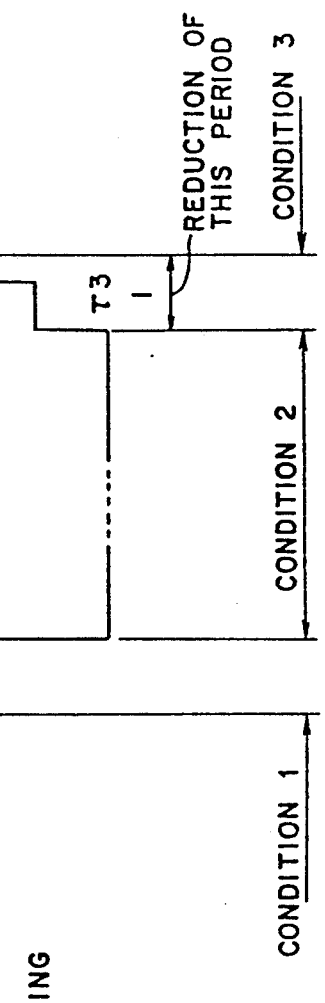
FIG. 12(a) SWITCHING TO TRANSMITTING SIDE
FIG. 12(b) SYNCHRONIZATION ON RECEIVING SIDE (SPEECH)
FIG. 12(c) SYNCHRONIZATION ON RECEIVING SIDE (FAX)
FIG. 12(d) OUTPUT OF DECODER

SYNCHRONISM ESTABLISHING METHOD AND APPARATUS

BACKGROUND OF THE INVENTION

This invention relates to a synchronism establishing method and apparatus.

Generally, in various systems for signal processing such as image signal processing or audio signal processing employed in communication in which a plurality of processes are achieved by a combination of several modules to extract a desired function as an apparatus or a unit, particularly, for example, in TDM (time division multiplexing) multiplexing apparatus or multi-media communication apparatus which employ digital circuits or multi-media switched networks as represented by a digital exchange or an ATM (asynchronous transfer mode) exchange, it is necessary to establish, on the receiver side, synchronism with the transmitter side.

Conventionally, when various media are involved in input signals, for example, for signal compressing processing of speech, a plurality of signal processing modules are used for the media. Also a determining section is used which analyzes a characteristic of an input signal to select a necessary signal processing module by means of some apparatus such as a service trunk in an exchange.

Accordingly, the kind of a medium inputted is identified and an optimum one of the signal processing modules is selected by the determining section. The result of processing of the selected processing module (information to be transmitted) is forwarded onto a transmission line to transmit it to the receiver side by switching control based on a result of the determination by the determining section. Meanwhile, some communication means is used to notify the receiver side of the result of the module selection.

On the receiver side which receives the information, decoding processing is performed and a reproduced signal is outputted by a module selected based on the information regarding the selected module.

However, normally a signal processing module in most cases effects encoding conforming to a multiplexing hierarchy of a communication apparatus (bearer rate), and sometimes it cannot assure a band for the notification of a result of determination thereof within a band of a channel allocated to it.

One alternative in this instance is transmission of switching information of a module making use of a control communication path which is assured for control between different communication apparatus. However, normally the control communication path does not assure a sufficient band to transmit information of the channel level on a real time basis. Also, from the point of view of the processing capacity of a control processor, it is difficult to apply the control communication path to any other processing than comparatively low speed processing such as switching of a call by voice.

Therefore, signal processing modules must be switched on a real time basis within a connected call in service. Besides, since it is difficult to transmit switching information between modules in a band allocated to the channel, it is necessary for the receiver side to obtain frame synchronization information in order to establish synchronism between processing cycles of modules on the transmitter side and the receiver side.

From the situation described above, a synchronism establishing method is conventionally performed using, for example, such a synchronism establishing apparatus as shown in FIG. 13 in order to transmit frame synchronization information.

Referring to FIG. 13, the conventional synchronism establishing apparatus shown is incorporated in a signal processing unit of a signal processing system and includes a facsimile (FAX) signal detecting codec 101 connected in parallel to a speech codec 102 and an echo canceller (ECAN) 5. Either one of the facsimile signal detecting codec 101 and the speech codec 102 is selected by a pair of selectors 3 and 4.

The facsimile signal detecting codec 101 and the speech codec 102 are connected to a multiplexing unit (MUX) not shown by way of an interface circuit 6 and also to a terminal not shown by way of another interface circuit 7.

Here, the facsimile signal detecting codec 101 and the speech codec 102 are individually used as modules which have independent synchronism establishing means. In this manner, normally two or more modules of different types are provided in combination in a signal processing unit of a signal processing system. Further, the facsimile signal detecting codec 101 and the speech codec 102 are switched so as to alternatively operate to effect transmission of a signal in accordance with the necessity.

When the signal processing unit shown is used as the master side apparatus, each of the facsimile signal detecting codec 101 and the speech codec 102 effects its respective processing operation when it detects establishment of synchronism based on its own frame pattern.

The facsimile signal detecting codec 101 detects a facsimile signal from within a signal transmitted thereto and decodes the signal when the signal is a coded signal, but encodes the signal when the signal is a decoded signal.

The speech codec 102 includes a speech encoder 102a and a speech decoder 102b which encode and decode a speech signal, respectively.

The synchronism establishing apparatus constructed from the modules described above operates in the following manner. In particular, a synchronization pattern, a period and so forth are switched between the modules to effect transmission or reception of a signal, and on the receiver side, it is determined by which module the signal can be pulled in in response to the module selection on the transmitter side. Then, a processing operation using the selected module itself is performed. In short, processing for establishment and protection of synchronism is performed individually among the modules.

Since the conventional synchronism establishing apparatus basically requires a combination of modules developed individually in this manner, where several existing modules are present, necessary functions can be realized comparatively easily.

While the conventional synchronism establishing apparatus basically requires a combination of modules developed individually, it has a problem to be solved that involves, upon switching between modules, a switching transition process having a time length corresponding to the number of protection stages necessary for pull in and protection of synchronism.

It is another problem to be solved that, due to the first problem described just above, an undefined state of a period equal to the frame period multiplied by the number of protection stages for establishment of synchronism is involved, and some masking processing is required such as stopping a decoded signal output.

SUMMARY OF THE INVENTION

It is an object of the present invention to provide a synchronism establishing method and apparatus including a plurality of modules having different independent synchronization patterns to be switched wherein the switching transition process has a time length corresponding to the number of protection stages necessary for pull in. In addition, protection of synchronism is reduced so small that the presence of such switching transition process can be ignored while assuring similar advantages to those of conventional synchronism establishing apparatus.

It is another object of the present invention to provide a synchronism establishing method and apparatus which minimizes the switching time upon releasing from a master side module to a slave side module.

It is a further object of the present invention to provide a synchronism establishing apparatus which minimizes the time required upon starting switching from a module to another module.

In order to attain the objects described above, according to a first aspect of the present invention, there is provided a synchronism establishing method for a system which includes a combination of two or more modules of different types having independent synchronism establishing means. The system selectively switches among the modules to effect transmission of a signal. When one of the modules on the master side establishes synchronism, the master side module performs its processing operation and delivers a notification of establishment of synchronism to the module or modules on the slave side. If the slave side module is in a condition wherein synchronism is established when the synchronism establishment notification is received from the master side module, the synchronizing operation of the slave side module is put into a waiting mode. Even if a number of abnormal synchronization patterns greater than the number of protection stages are detected, the slave side module does not determine a pull out condition and maintains the pulled in phase. If the slave side module detects, after receiving a notification from the master side module that a pull out condition has occurred in the master side module. The slave side module detects a normal synchronization pattern at several stages just prior to such reception of the notification. The number of the stages-needed to establish synchronism when the slave side module is in the waiting mode-is set smaller than the number of protection stages needed for pull in from any other condition, when synchronism has been established with the slave side module, the slave side processing operation resumes.

According to a second aspect of the present invention, there is provided a synchronism establishing apparatus for a system which includes a combination of two or more modules of different types having independent synchronism establishing means. The system selectively switches among the modules to effect transmission of a signal. -The synchronism establishing apparatus in-cludes-frame pull in processing means provided in each of the modules which serves as the synchronism establishing means when a signal is to be decoded. Synchronism establishment notifying means is provided for de-livering, when establishment of synchronism is detected by the frame pull in processing means of one of the modules on the master side, a notification of the establishment of synchronism of the master side module from the frame pull in processing means of the master side module to the frame pull in processing means of the other module or modules on the slave side. Mode changing means are provided for each of the slave side module or modules for changing, when the slave side module is in a condition wherein synchronism is established at a point in time when the notification of establishment of synchronism is received from the master side module, the synchronizing operation of the frame pull in processing means into a waiting mode. Phase maintaining means are provided for each of the slave side module or modules for determining, even when a number of abnormal synchronization patterns greater than the number of protection stages are detected after the transition to the waiting mode by the mode changing means, a pull out condition, and maintaining the pulled in phase. Processing operation resuming means are provided for each of the slave side module or modules for determining-that synchronism is established with the slave side module and resuming the processing operation of the slave side module--;, when the frame pull in processing means of the slave side module detects, after a notification that a pull out condition has occurred in the master side module is received from the frame pull in processing means of the master side module, a normal synchronization pattern at several stages just prior to the reception of the notification of a pull in condition in which the number of the stages is set smaller than the number of protection stages for pull in from any other condition wherein synchronism is not entered during the waiting mode.

Preferably, the frame pull in processing means of each of the slave side modules normally supervises to check whether or not a synchronization pattern appears with the pulled in phase when the frame pull in processing means remains in the waiting mode.

The master side module may demodulate a modulated signal other than a modulated speech signal, and at least one of the slave side module or modules may demodulate a compressed coded speech signal. In this instance, the master side module may demodulate a modulated facsimile signal.

Alternatively, the master side module may demodulate a compressed coded speech signal, and the slave side module or modules may demodulate a modulated signal or signals other than a modulated speech signal. Also in this instance, at least one of the slave side module or modules may demodulate a modulated facsimile signal.

According to a third aspect of the present invention, there is provided a synchronism establishing method for a system which includes a combination of two or more modules of different types. The modules have independent synchronism establishing means and the system selectively switches among the modules to effect transmission of a signal. The modules have frame periods set so as to present a ratio in integral number between them, and the frame generating periods are synchronized on the transmission side. On the receiving side, when synchronism is entered with any of the modules, a notification of a timing based on the synchronism is delivered to each of the other module or modules on the waiting side. In each waiting side module, hunting of a synchronization pattern is performed based on the timing and then, at a point in time when a pull out condition of the module notified of the timing is detected, the operative module is switched immediately, if synchronism is established with the waiting side module. The waiting side modules have a number of pull in stages which is set smaller than the number of protection stages for pull in from a condition wherein synchronism is not entered.

The frame periods of the modules may be set to an equal period, or alternatively, set equal to the frame period of a particular one of the modules multiplied by an integral number.

According to a fourth aspect of the present invention, there is provided a synchronism establishing apparatus for a system which includes a combination of two or more modules of different types. The modules have independent synchronism establishing means and the system selectively switches among the modules to effect transmission of a signal. The synchronism establishing apparatus includes frame synchronizing signal generating means for each of the modules on the transmitting side, which are used upon coding of a signal. Synchronizing means are provided for each of the modules on the transmitting side for causing a timing signal to be communicated between the frame synchronizing signal generating means of the modules on the transmitting side to synchronize the frame generation periods on the transmitting side. Frame pull in processing means are provided for each of the modules on the receiving side and are used as the synchronism establishing means upon decoding of a signal. Notifying means are provided for each of the modules on the receiving side for delivering, when synchronism is entered with the frame pull in processing means of the module, a synchronizing timing signal based on synchronism with the frame pull in processing means of the other receiving side module or modules on the receiving side. In this manner the frame pull in processing means of each of the waiting side module or modules on the receiving side effects hunting of a synchronization pattern based on the synchronizing timing signal and effects, at a point in time when a pull out condition of the module which has delivered the synchronizing timing signal is detected, switching of the operative module immediately if synchronism is established with a number of pull in stages set smaller than the number of protection stages for pull in from a condition wherein synchronization is not entered.

The modules on the transmitting side may include a first module which modulates and transmits a signal other than a speech signal, and a second module which converts a speech signal into a compressed coded signal and transmits the compressed coded speech signal. The modules on the receiving side may include a third module for demodulating the modulated signal from the first module, and a fourth module for decoding the compressed coded speech signal from the second module. In this instance, the first module may modulate and transmit a facsimile signal, and the third module may demodulate the modulated facsimile signal from the first module.

In the synchronism establishing method and apparatus, the pull in process which is required upon switching between modules can be reduced while maintaining the advantage, similarly to the conventional synchronism establishing method and apparatus, that the apparatus can basically be constructed by a combination of modules developed individually. In particular, on the transmitting side, the condition wherein, although switching between modules has been completed, signal reproducing processing cannot be performed since synchronism is not established on the receiving side as yet can be reduced significantly. In other words, when re-switching from the master side module to a slave side module is performed, an ordinary pull in process can be omitted and communications can be resumed from a synchronism holding condition.

In this manner, with the synchronism establishing method and apparatus of the present invention, the switching time upon releasing from the master side module to a slave side module can be reduced. Also, the time upon starting of switching from one to another module can be reduced.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIGS. 7(a) and 7(b) are diagrammatic views showing positions of synchronizing flag bits;

FIGS. 8(a) and 8(b) are diagrammatic views showing positions of synchronizing flag bits according to the speech compressing and transmitting unit of FIG. 2;

FIGS. 9(a) and 9(b) are similar views but showing positions of synchronizing flag bits according to the speech compressing and transmitting unit of FIG. 4;

FIG. 10 is a table showing the constructions of codecs employed in the speech compressing and transmitting units of FIGS. 2 and 4;

FIGS. 12(a) to 12(d) are waveform diagrams illustrating operation of the speech compressing and transmitting units of FIGS. 2 and 4.

DESCRIPTION OF THE PREFERRED EMBODIMENTS

Figure 1:
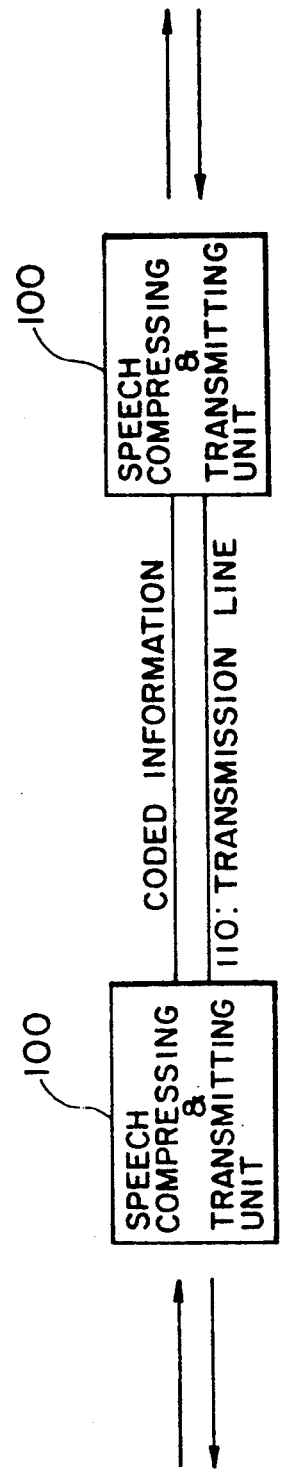
FIG. 1 is a block diagram showing a signal processing system including a pair of speech compressing and transmitting units disposed on the transmitter side and the receiver side.

Referring first to FIG. 1, there is shown a signal processing system wherein a pair of speech compressing and transmitting units are disposed on both the transmitter side and the receiver side. In particular, a pair of speech compressing and transmitting units 100 are disposed on the transmitter side and the receiver side and are connected to each other by way of a transmission line 110.

Each of the speech compressing and transmitting units 100 switches an encoder for a speech signal and another encoder for a facsimile signal in response to detection of a facsimile signal to effect transmission of a signal.

Figure 2:
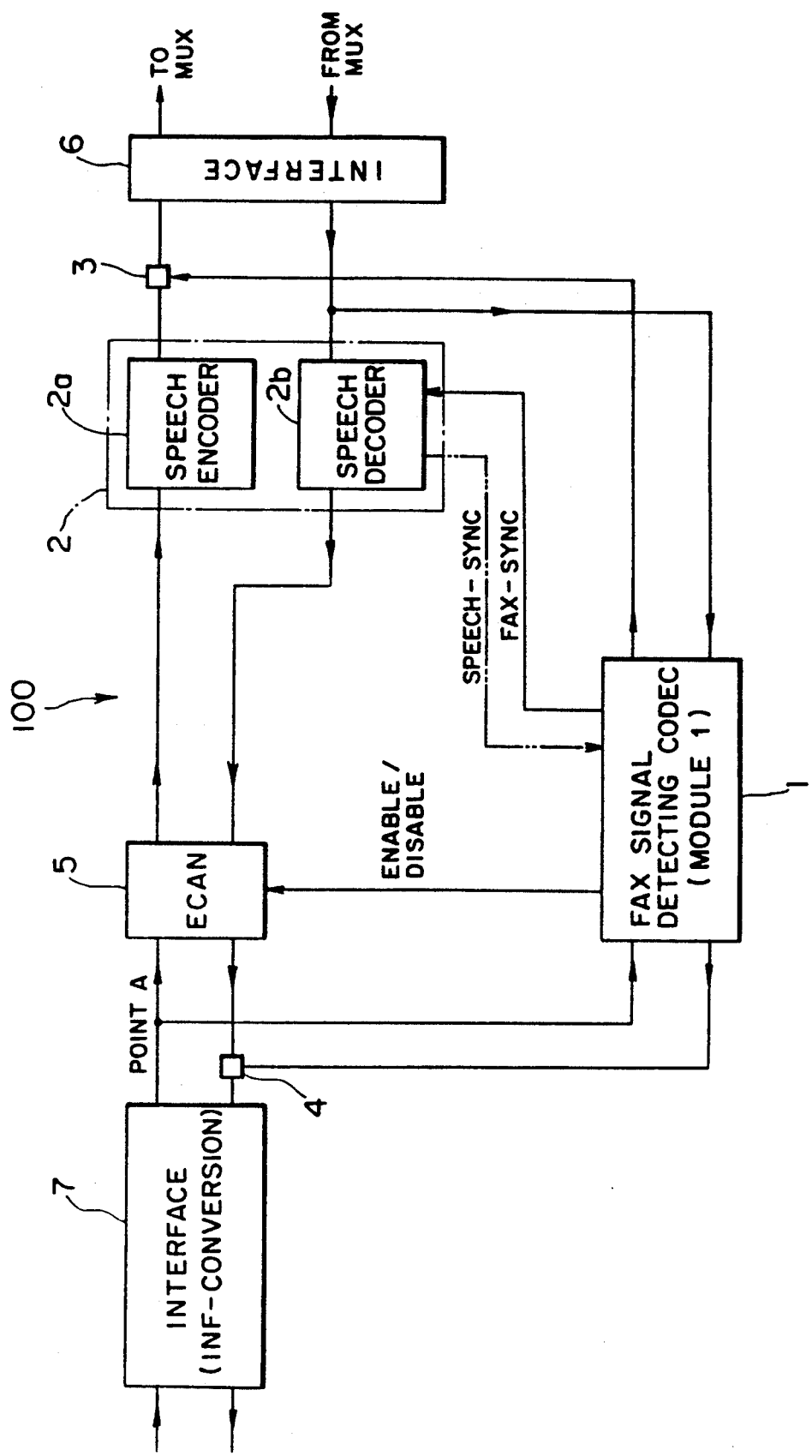
FIG. 2 is a block diagram of a speech compressing and transmitting unit showing a first preferred embodiment of the present invention.

Referring now to FIG. 2, each of the speech compressing and transmitting units 100 includes a facsimile signal detecting codec 1 serving as a master side module. The facsimile signal detecting codec 1 is connected in parallel to a speech codec 2 and an echo canceller (ECAN) 5 which serve as slave side modules, and either one of the facsimile signal detecting codec 1 and the speech codec 2 is selected by means of a pair of selectors 3 and 4.

The facsimile signal detecting codec 1 and the speech codec 2 are connected to a multiplexing unit (MUX) not shown by way of an interface circuit 6 and also to a terminal not shown by way of another interface circuit 7.

Figure 3:
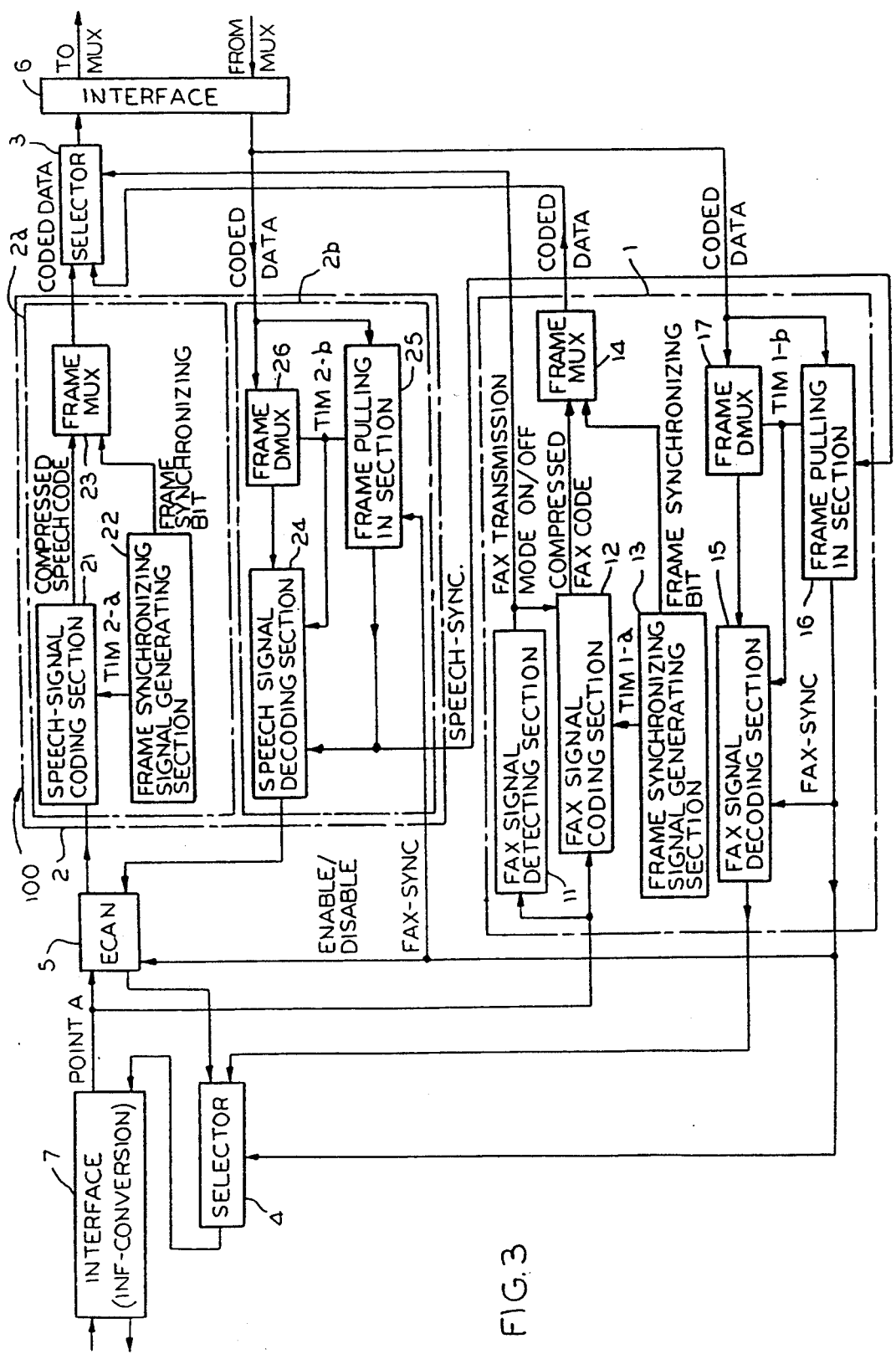
FIG. 3 is a block diagram showing details of the speech compressing and transmitting unit of FIG. 2.

The speech compressing and transmitting unit 100 is shown more in detail in FIG. 3. Referring to FIG. 3, the facsimile signal detecting codec 1 includes a facsimile signal detecting section 11, a facsimile signal coding section 12, a frame synchronizing signal generating section 13, a frame multiplexing section 14, a facsimile signal decoding section 15, a frame pull in processing section 16 and a frame demultiplexing section 17.

The facsimile signal detecting section 11 detects a facsimile signal from the terminal side. When the facsimile signal detecting section 11 detects a facsimile signal, it transmits facsimile transmission mode on information to the facsimile signal coding section 12 and the selector 3. When the facsimile signal detecting section 11 detects no facsimile signal, it transmits facsimile transmission mode off information to the facsimile signal coding section 12 and the selector 3.

The facsimile signal coding section 12, the frame synchronizing signal generating section 13 and the frame multiplexing section 14 constitute a facsimile signal transmitting section. When facsimile transmission mode on information is received from the facsimile signal detecting section 11, the facsimile signal coding section 12 encodes the facsimile signal while its operation time is controlled in accordance with a frame timing signal Tim1-a from the frame synchronizing signal generating section 13.

Figure 6A:
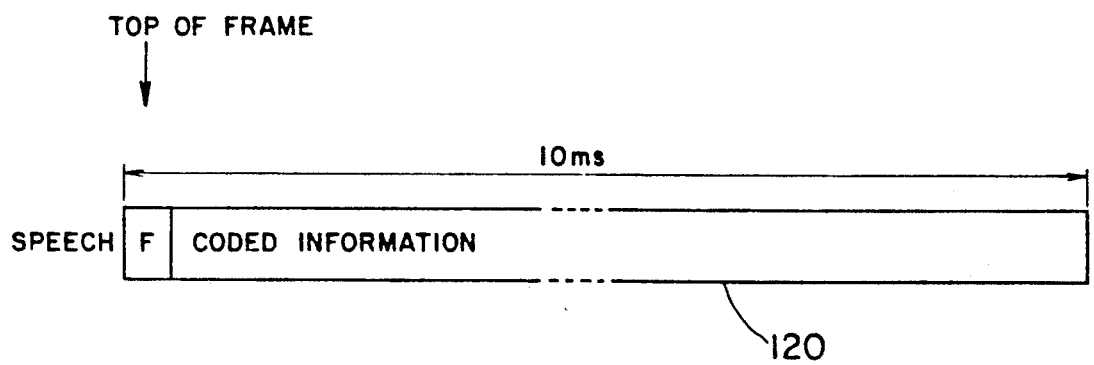
FIGS. 6(a) and 6(b) are diagrammatic views showing synchronizing flag bits.
Figure 6B:
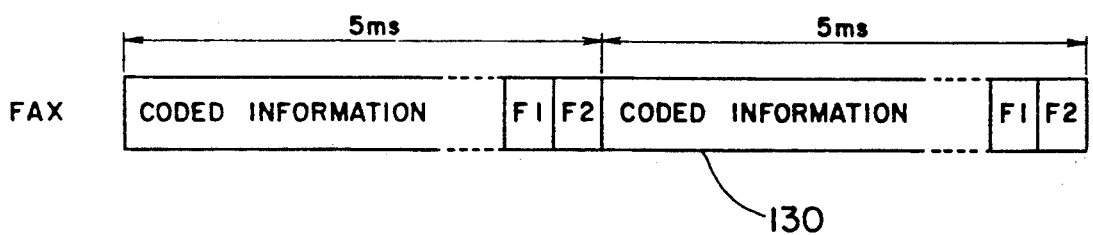

The frame synchronizing signal generating section 13 generates and supplies such frame timing signal Tim1-a to the facsimile signal coding section 12 and further generates frame synchronizing bits F1 and F2 (refer to F1 and F2 shown in FIG. 6(b)).

The frame multiplexing section 14 multiplexes coded information from the facsimile signal coding section 12 and the frame synchronizing bits F1 and F2 from the frame synchronizing signal generating section 13. An example of a frame of a signal multiplexed by the frame multiplexing section 14 is illustrated in FIG. 6(b).

The facsimile signal decoding section 15, the frame pull in processing section 16 and the frame demultiplexing section 17 constitute a facsimile signal receiving section. The frame pull in processing section 16 extracts synchronizing bits from received data, effects necessary front protection and effects frame pull in processing. After synchronism is established, the frame pull in processing section 16 delivers a signal (synchronism establishment notifying signal) FAX-SYNC representative of such establishment of synchronism to the facsimile signal decoding section 15 as well as to the selector 4, the echo canceller 5 and the speech codec 2. Further, after synchronism is established, the frame pull in processing section 16 outputs a timing signal Tim1-b to the facsimile signal decoding section 15 and the frame demultiplexing section 17 at predetermined intervals.

The facsimile signal decoding section 15 decodes, after the synchronism establishment notifying signal FAX-SYNC is received from the frame pull in processing section 16, a modulated facsimile signal transmitted thereto in response to the timing signal Tim1-b.

The frame demultiplexing section 17 demodulates coded information to the facsimile signal decoding section 15 in response to the timing signal Tim1-b from the frame pull in processing section 16.

Meanwhile, the speech codec 2 is constituted from a speech encoder 2a and a speech decoder 2b which encode and decode a speech signal, respectively. The speech encoder 2a includes a speech signal coding section 21, a frame synchronizing signal generating section 22 and a frame multiplexing section 23. The speech decoder 2b includes a speech signal decoding section 24, a frame pull in processing section 25 and a frame demultiplexing section 26.

The speech signal coding section 21 compresses and encodes a speech signal while its operation timing is controlled in accordance with a frame timing signal Tim2-a from the frame synchronizing signal generating section 22.

The frame synchronizing signal generating section 22 generates and supplies a frame timing signal Tim2-a to the speech signal coding section 21 and further generates a frame synchronizing bit F (refer to F of FIG. 6(a)).

The frame multiplexing section 23 multiplexes coded information from the speech signal coding section 21 and the frame synchronizing bit F from the frame synchronizing signal generating section 22. An example of a frame of a signal multiplexed by the frame multiplexing section 23 is illustrated in FIG. 6(a).

The speech signal decoding section 24 decodes, after a synchronism establishment notifying signal SPEECH-SYNC is received from the frame pull in processing section 25, a speech signal transmitted in a compressed coded condition thereto in response to the timing signal Tim2-b.

The frame demultiplexing section 26 demultiplexes coded information to the speech signal decoding section 24 in response to the timing signal Tim2-b from the frame pull in processing section 25.

The frame pull in processing section 25 extracts a synchronizing bit from received data, effects necessary front protection and effects frame pull in processing. After synchronism is established, the frame pull in processing section 25 delivers a signal (synchronism establishment notifying signal) SPEECH-SYNC representative of such establishment of synchronism to the speech signal decoding section 24. Further, after synchronism is established, the frame pull in processing section 25 outputs a timing signal Tim2-b at predetermined intervals to the speech signal decoding section 24 and the frame demultiplexing section 26.

The frame pull in processing section 25 has an additional function that, when a synchronism establishment notifying signal FAX-SYNC is received from the frame pull in processing section 16 of the facsimile signal detecting codec 1, if the speech codec 2 is, at the point in time, in a condition in which synchronism is established, the frame pull in processing section 25 puts its synchronizing operation into a waiting mode, in which it does not determine, even when a number of abnormal synchronization patterns greater than the number of rearward protection stages (one stage corresponds to one multi-frame described hereinbelow) are detected, a pull out condition and thus maintains the pulled in phase, and then it routinely supervises to check whether or not a synchronization pattern appears with the pulled in phase.

Accordingly, if the frame pull in processing section 25 detects, after it receives the notification from the frame pull in processing section 16 of the facsimile signal detecting codec 1 that a pull out condition has occurred with the facsimile signal detecting codec 1, a normal synchronization pattern at several stages just prior to such reception of the notification of a pull in condition in which the number of such stages is set smaller than the number of protection stages for the case wherein the facsimile signal detecting codec 1 is pulled in from any other condition in which it is not in synchronism than a waiting mode, the frame pull in processing section 25 determines that the speech codec 2 has entered into a synchronized condition, and can resume its processing operation.

It is to be noted that the following function may be additionally provided to the frame pull in processing section 16 of the facsimile signal detecting codec 1. In particular, the frame pull in processing section 16 is additionally provided with the function that, when a synchronism establishment notifying signal SPEECH-SYNC is received from the frame pull in processing section 25 of the speech codec 2, the frame pull in processing section 16 puts its synchronizing operation into a waiting mode, in which it does not determine, even when a number of abnormal synchronization patterns greater than the number of rearward protection stages are detected, a pull out condition and thus maintains the pulled in phase, and then it normally supervises to check whether or not a synchronization pattern appears with the pulled in phase.

Accordingly, the frame pull in processing section 16 thus provided with the additional function determines, after it receives the notification from the frame pull in processing section 25 of the speech codec 2 that a pull out condition has occurred with the speech codec 2, when it detects a normal synchronization pattern at several stages just prior to the reception of the notification in a pull in condition in which the number of such stages is set smaller than the number of protection stages for the case wherein the facsimile signal detecting codec 1 is pulled in from any other condition in which it is not in synchronism than a waiting mode, that the facsimile signal detecting codec 1 has entered into a synchronized condition, and can resume its processing operation.

It is to be noted that, while a synchronizing flag bit F constructed in such a configuration as seen from FIG. 6(a) is used in the speech codec 2 as described above, it is accommodated into a frame 120 of a predetermined format by generating it by means of the frame synchronizing signal generating section 22 which controls an operation timing of the speech signal coding section 21 in response to a frame timing signal Tim2-a and multiplexing it with a compressed speech signal (coded information) by means of the frame multiplexing section 23. The frame 120 which accommodates the synchronizing flag bit F therein has, as an example, a frame period of 10 ms, and the number of bits which can be assigned to the synchronizing flag within frame bits is 1.

While synchronizing flag bits F1 and F2 constructed in such a configuration as seen in FIG. 6(b) are used also in the facsimile signal detecting codec 1 as described above, they are accommodated into a frame 130 of a predetermined format by generating them by means of the frame synchronizing signal generating section 13, which controls the operation timing of the facsimile signal coding section 12 in response to a frame timing signal Tim1-a and multiplexing them with a compressed facsimile signal (coded information) by means of the frame multiplexing section 14. The frame 130 which accommodates the synchronizing flag bits F1 and F2 therein has, for example, a frame period of 5 ms, and the number of bits which can be assigned to the synchronizing flag within frame bits is 2.

The synchronizing flag bits described above are constructed in such flag patterns that do not cause false synchronism. However, the synchronizing flag bits can be disposed to fully arbitrary positions in that the flag bits on the facsimile side may be dispersed or may be displaced to the top of the frame (refer to FIGS. 7(a) and 7(b) and FIGS. 8(a) and 8(b)).

It is to be noted that, while FIG. 10 shows synchronization patterns and synchronism protection stage numbers in the present embodiment, the specific values in FIGS. 6 and 10 are not essential matters but are given only for convenience of description.

In this manner, in the facsimile signal detecting codec 1, a facsimile signal is detected from a signal transmitted thereto by the facsimile signal detecting section 11, and if the received signal is a facsimile signal, then it is encoded by the facsimile signal coding section 12. Further, when synchronism on the facsimile side is entered by the frame pull in processing section 16, decoding can be performed by the facsimile signal decoding section 15.

Further, the speech codec 2 is constituted from the speech encoder 2a and the speech decoder 2b and can encode and decode a speech signal.

Accordingly, the facsimile signal detecting codec 1 and the speech codec 2 shown in FIGS. 2 and 3 are constructed such that they can perform similar functions to those of the conventional synchronism establishing apparatus described above as well as the following functions when necessitated.

In particular, the facsimile signal detecting codec 1 and the speech codec 2 have independent synchronizing establishing means (frame pull in processing sections 16 and 25, respectively) and are provided in combination of different modules of different types, and when necessary, an operating one of them is switched by a switching operation of the selectors 3 and 4.

It is to be noted that the synchronism establishing apparatus of the present embodiment is constructed such that, when a facsimile signal is detected by the facsimile signal detecting section 11, the selector 3 is switched to the facsimile signal detecting codec 1 side, but when synchronism of the facsimile side is established by the frame pull in processing section 16, the selector 4 is switched to the facsimile signal decoding section 15 side.

Further, each of the facsimile signal detecting codec 1 and the speech codec 2 is constructed such that, when it is used as the master side module (in the present embodiment, the facsimile signal detecting codec 1), it performs the following function.

In particular, when one of the frame pull in processing sections 16 and 25 detects establishment of synchronism with a frame pattern of itself, the facsimile signal detecting codec 1 (or the speech codec 2) performs a processing operation of itself by means of the facsimile signal decoding section 15 (or the speech signal decoding section 24) and notifies the speech codec 2 (or the facsimile signal detecting codec 1) of the establishment of synchronism of itself as a FAX-SYNC signal (or a SPEECH-SYNC signal).

On the other hand, each of the facsimile signal detecting codec 1 and the speech codec 2 is constructed such that, when it is used as a slave side module (in the present embodiment, the speech codec 2), it performs the following function.

In particular, when the speech codec 2 (or the facsimile signal detecting codec 1) receives a notification of establishment of synchronism as a FAX-SYNC signal (or a SPEECH-SYNC signal) from the facsimile signal detecting codec 1 (or the speech codec 2), if it is in a condition wherein synchronism is established, then it puts the operation mode of itself into a waiting mode by means of the frame pull in processing section 25 (or the frame pull in processing section 16). Further, the speech codec 2 (or the facsimile signal detecting codec 1) does not determine, in a waiting mode, as a function of the frame pull in processing section 25 (or the frame pull in processing section 16), a pull out condition even if a number of abnormal synchronization patterns greater than the number of protection stages are detected, and maintains the thus pulled in phase and normally performs monitoring to check whether or not a synchronization pattern appears with the maintained phase.

Further, the speech codec 2 (or the facsimile signal detecting codec 1) is constructed such that, after it receives a notification from the facsimile signal detecting codec 1 (or the speech codec 2) that a pull out condition has occurred with the facsimile signal detecting codec 1 (or the speech codec 2), when it detects a normal synchronization pattern at several stages just prior to such reception of the notification in a pull in condition in which the number of such stages is set smaller than the number of protection stages for the case wherein the facsimile signal detecting codec 1 is pulled in from any condition in which it is not in synchronism other than a waiting mode, it determines that synchronism of itself has been entered and resumes its processing operation.

By the way, the echo canceller 5 is provided where the coding delay or the transmission line delay involved is so great as to cause an echo, but is unnecessary when such delay is sufficiently small.

Due to the construction described above, when the operative module is to be switched once from the encoder for a speech signal to the encoder for a facsimile signal in response to detection of a facsimile signal and then speech transmission is to be released, the synchronism establishing apparatus operates in the following manner.

In particular, as seen from FIGS. 2 and 3, a signal from the terminal side is inputted by way of the interface circuit 7 and is branched, at a point A, to the speech encoder 2a side and the facsimile signal detecting codec 1 side.

The facsimile signal detecting section 11 of the facsimile signal detecting codec 1 thus detects the facsimile signal. Once the facsimile signal is detected by the facsimile signal detecting section 11, the signal to be supplied to the interface circuit 6 is switched from coded information from the speech encoder 2a to coded information from the facsimile signal detecting codec 1 by the selector 3. Thereafter, the coded information is sent out from the interface circuit 6 to the multiplexing unit so that it is transmitted to the opposing unit.

In the opposing unit having a similar construction, the coded information received is inputted to both of the speech decoder 2b side and the facsimile signal detecting codec 1 side. At this point in time, the facsimile signal detecting codec 1 and the speech codec 2 both remain in a condition (SYNC ERROR condition) in which no synchronism is established as seen from (1) and (1') of FIG. 11. Thereafter, each encoder on the receiver side performs a pull in operation with a synchronization pattern of itself by means of the frame pull in processing section.

The pull in operation is a process which is necessitated because any encoder on the receiver side cannot specify a decoding timing because of delays of operation timings of the encoders on the transmitter side and transmission lines used and so forth.

Figure 11:
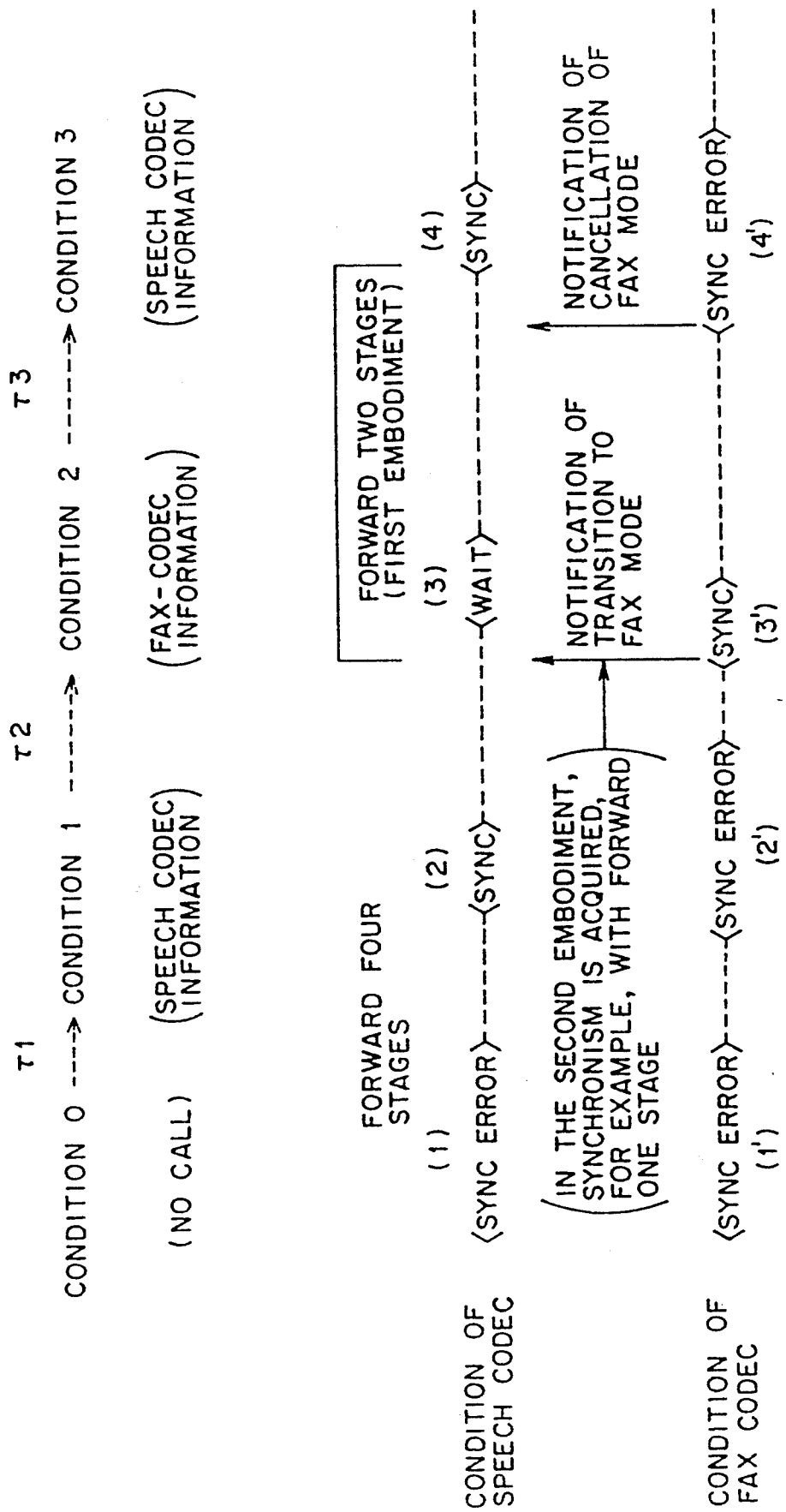
FIG. 11 is a diagram illustrating operation of the speech compressing and transmitting units of FIGS. 2 and 4.

Thus, it is assumed here that, as a result of the pull in operation, the speech codec 2 side first establishes synchronism to perform communications while the facsimile signal detecting codec 1 remains in a condition wherein no synchronism is established as yet as seen from (2) and (2') of FIG. 11.

If, in this condition, the facsimile signal detecting codec 1 detects establishment of synchronism with a frame pattern of itself as a result of pull in processing (refer to (3') of FIG. 11), then it performs a processing operation of itself. Further, it notifies the speech codec 2 of the establishment of synchronism of itself (FAX-SYNC in FIGS. 2 and 3 or a notification of transition to a facsimile mode in FIG. 11).

The speech codec 2' having received the notification of the establishment of synchronism from the facsimile signal detecting codec 1' puts its synchronizing operation into a waiting mode ((3) of FIG. 11), by means of the frame pull in processing section.

Then, even if the frame pull in processing section 25 detects a number of abnormal synchronization patterns greater than the rearward protection stages, the speech codec 2 does not determine a pull out condition and maintains the pull in information. Further, it continues checking of the synchronization pattern to count the number of coincident forward stages.

Thereafter, when the result of determination at the facsimile signal detecting section 11 indicates that the communication in the facsimile mode has been completed, the facsimile signal detecting codec 1 on the master side switches the selector 3 to the speech side and ends the communication of itself ((4') of FIG. 11). Consequently, a pull out condition takes place naturally with the frame pull in processing section 16 of the facsimile signal detecting codec 1 on the opposing side, and the facsimile signal detecting codec 1 delivers to the speech codec 2 on the slave side the notification that a pull out condition has taken place with the facsimile signal detecting codec 1 itself (notification of cancellation of the facsimile mode in FIG. 11).

When the speech codec 2 on the slave side receives the notification from the facsimile signal detecting codec 1 on the master side that a pull out condition has taken place with the facsimile signal detecting codec 1, it detects synchronization patterns at several stages just prior to then.

Then, if the speech codec 2 detects that the synchronization patterns at the several stages just prior to then are normal, then it determines that synchronism has been entered with it and thus resumes a processing operation thereof ((4) of FIG. 11). In the case shown in FIG. 10, transition from the condition (3) to the condition (4) of FIG. 11 is performed when synchronism at forward two stages is established with the speech codec 2.

Then, since, in this instance, the facsimile signal detecting codec 1 is the master side module, the selector 4 is switched to the speech codec 2 side so that a reproduced speech signal is outputted from the interface circuit 7.

In this instance, the fact is utilized that, if a call is connected and the channel enters into a communication mode, then unless an abnormal communication condition such as a transmission line trouble occurs, the operation timings of the encoders on the transmitter side and the encoders on the receiver side are kept in fixed conditions relative to each other. This is because, if the synchronizing operation of the speech codec 2 is placed in advance in a waiting mode so as to hold phase information as described above, then unless an abnormal communication condition such as a transmission line trouble occurs, the operation timings of the encoders on the transmitter side and the encoders on the receiver side are kept in fixed conditions relative to each other, similarly as in the case wherein the channel has entered into a communication mode.

It is to be noted that, with regard to pull in, quite equivalent operations to those of the embodiment described above will be obtained if a processing section, a frame multiplexing section (MUX section) and a separating section (DMUX section) are not provided for exclusive use as in the present embodiment but are integrated with sections for coding and decoding processing. Further, quite equivalent operations to those described above are provided even if pull in processes are performed for individual modules but similar processes are performed by means of a pull in block (module) for exclusive use. Furthermore, it is naturally possible to reverse the master and the slave of the codecs.

Where a system which includes a combination of two or more modules of different types having independent synchronism establishing means and switches, when necessary, an operative one of the modules to effect transmission is constructed such that, after a notification of establishment of synchronism of the facsimile signal detecting on the master side, which performs a processing operation of itself when it detects establishment of synchronism with a frame pattern of itself, is received, a pull out condition is not determined and the pulled in phase is thereafter maintained even if the speech codec 2 detects a number of abnormal synchronization patterns greater than the number of protection stages. If a notification that a pull out condition has taken place is received and then several normal synchronization patterns are detected just prior to such reception of the notification, then a processing operation is resumed, and the following advantage is achieved.

In particular, when such condition control is performed, the switching time ($\tau 3$ in FIG. 11) upon releasing from the facsimile signal detecting codec 1 to the speech codec 2 can be reduced remarkably comparing with alternative condition control wherein synchronism is entered independently with each codec.

In the following, the degree of the advantage will be calculated by way of trial in terms of a minimum switching time and compared with that of a conventional apparatus.

Figure 13:
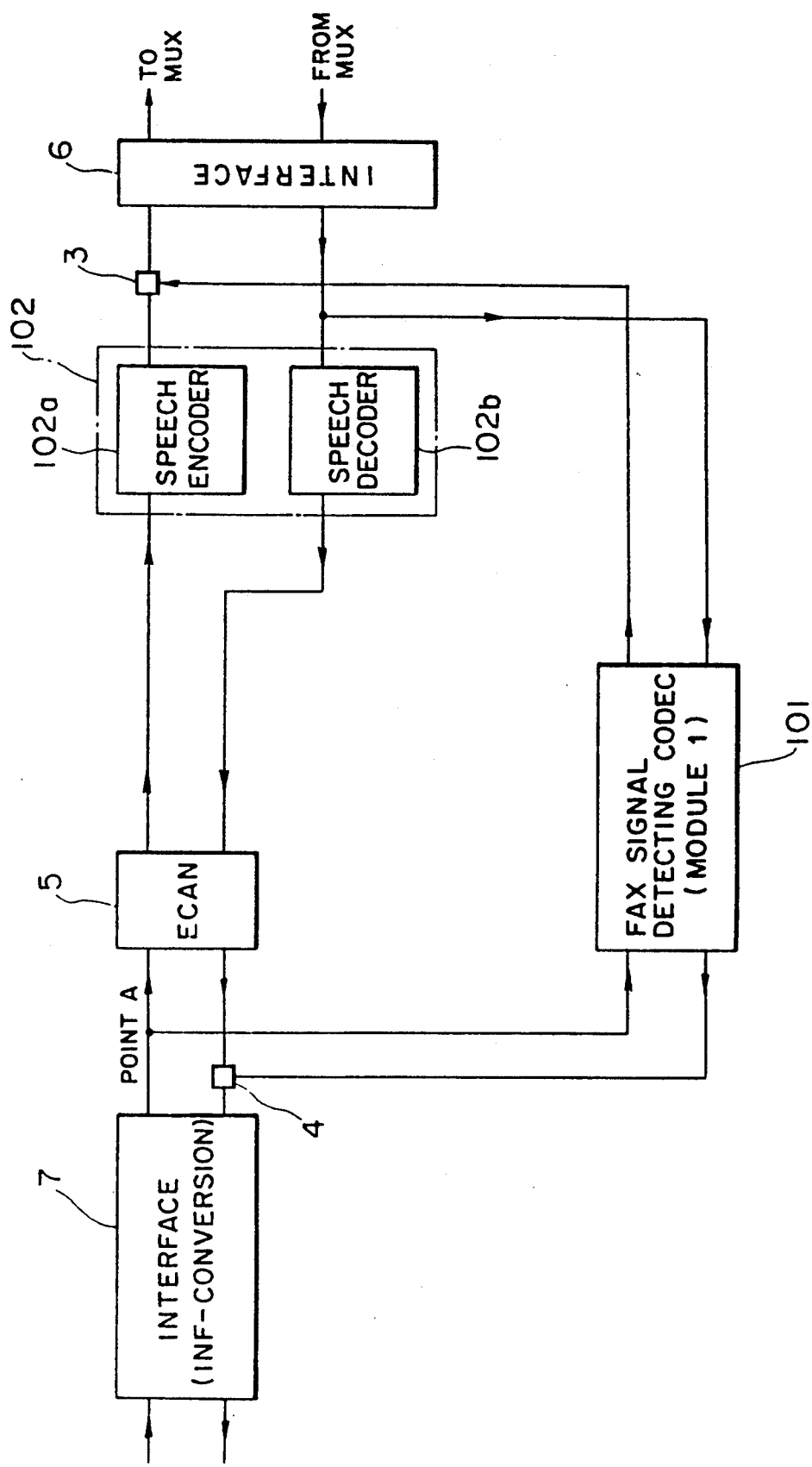
FIG. 13 is a block diagram showing a conventional synchronism establishing apparatus.

In the conventional apparatus shown in FIG. 13, the detecting time for a pull out condition of the facsimile signal detecting codec 101 is calculated in the following manner when synchronism is entered independently for each codec. It is to be noted that, in this instance, the speech codec 102 is completely inoperative in a facsimile mode.

In particular, since rearward four stages are involved, at least four multi-frames (15 ms × 4 = 60 ms) in terms of facsimile frames are required after switching from the speech codec.

Meanwhile, with regard to the pull in time of the speech codec 102, since forward four stages are involved, at least four multi-frames (40 ms × 4 = 160 ms) are required in terms of speech frames.

Accordingly, the length of minimum multi-frames required by the time of $\tau 3$ of FIG. 11 is 220 ms (= 60 ms + 160 ms < $\tau 3$).

By the way, in the method of the present invention, a facsimile mode cancellation notification comes to the speech codec 2 in 60 ms which is a minimum time required for detection of interruption of synchronism of the facsimile signal detecting codec 1.

However, in the speech codec 2, the number of stages of coincident synchronization patterns has been counted retroactively and the pull in stage number in a waiting mode is 2 (refer to FIG. 10).

Therefore, in the shortest case, switching to the speech codec 2 is performed in two multi-frames after actual switching to the speech codec 2.

Accordingly, the length of minimum multi-frames required by the time of $\tau 3$ of FIG. 11 is 80 ms (= 40 ms × 2 < $\tau 3$).

As can be seen from the results of the calculation by trial, with the synchronism establishing method and apparatus of the present invention, the minimum time for pull in processing upon switching of a module from the master side to the slave side can be reduced more remarkably than ever. Further, if this is shown with a figure, then it corresponds to a saved time corresponding to a distance indicated at A in FIG. 12(d).

It is to be noted that the reason why the calculation by trial is performed in terms of minimum times is that, if a system which involves random bit errors due to the quality of the transmission line is considered, then there is the possibility that an error may occur at a flag bit and this may delay switching.

Further, also when the phases and periods of the facsimile signal detecting codec 1 and the speech codec 2 are not specified by some other reason, the time of 1 MF (1 multi-frame) to the maximum may be required.

It is to be noted that the apparatus described above may be modified such that the speech codec 2 is set as a master side module while the facsimile signal detecting codec 1 is set as a slave side module such that the speech codec 2 delivers a notification of establishment of synchronism (SPEECH-SYNC in FIGS. 2 and 3) of the speech codec 2 to the facsimile signal detecting codec 1. When the notification of establishment of synchronism is received from the speech codec 2, the facsimile signal detecting codec 1 puts the synchronizing operation of the module of itself into a waiting mode, in which a pull out condition is not determined and the pulled in phase is thereafter maintained even if a number of abnormal synchronization patterns greater than the number of protection stages are detected. If a normal synchronization pattern is detected at several stages immediately before a notification that a pull out condition has taken place with the speech codec 2, then it is determined that synchronism of the facsimile signal detecting codec 1 has been entered and a processing operation of the facsimile signal detecting codec 1 is resumed.

Figure 4:
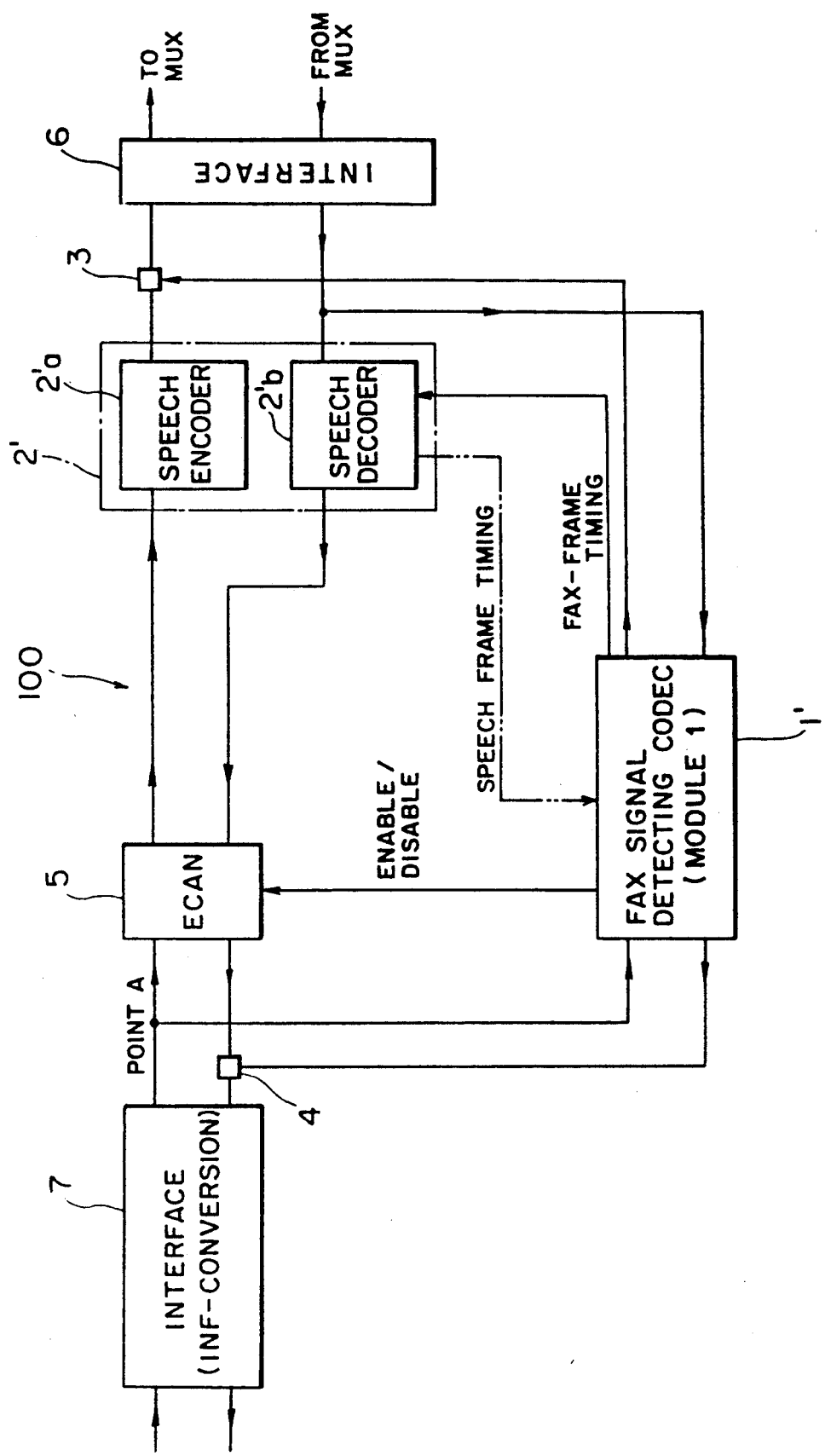
FIG. 4 is a block diagram of another speech compressing and transmitting unit showing a second preferred embodiment of the present invention.
Figure 5:
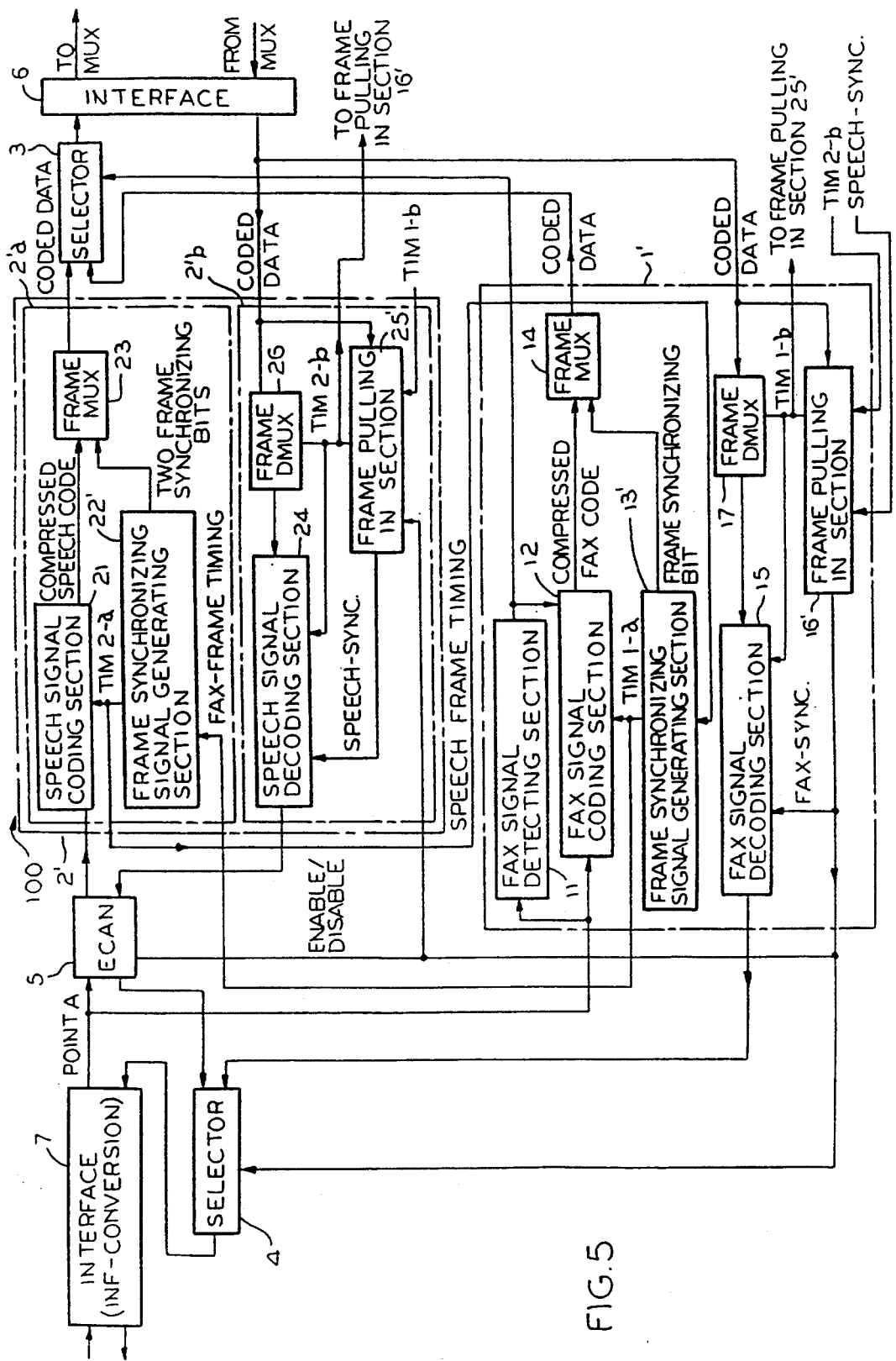
FIG. 5 is a block diagram showing details of the speech compressing and transmitting unit of FIG. 4.

Referring now to FIGS. 4 and 5, there is shown a synchronism establishing apparatus according to a second preferred embodiment of the present invention. The synchronism establishing apparatus of the present embodiment is a modification to and is different from the synchronism establishing apparatus of the preceding embodiment in that it includes a facsimile signal detecting codec 1' and a speech codec 2' in place of the facsimile signal detecting codec 1 and the speech codec 2, respectively.

The facsimile signal detecting codec 1' and the speech codec 2' have the following functions in addition to those of the facsimile signal detecting codec 1 and the speech codec 2 described above, respectively.

In particular, the facsimile signal detecting codec 1' includes a facsimile signal detecting section 11, a facsimile signal coding section 12, a frame synchronizing signal generating section 13', a frame multiplexing section 14, a facsimile signal decoding section 15, a frame pull in processing section 16' and a frame demultiplexing section 17. Meanwhile, the speech codec 2' includes a speech encoder 2'a and a speech decoder 2'b. The speech encoder 2'a includes a speech signal coding section 21, a frame synchronizing signal generating section 22', and a frame multiplexing section 23. The speech decoder 2'b includes a speech signal decoding section 24, a frame pull in processing section 25', and a frame demultiplexing section 17.

Here, the facsimile signal detecting section 11, the facsimile signal coding section 12, the frame multiplexing section 14, the facsimile signal decoding section 15 and the frame demultiplexing section 17 of the facsimile signal detecting codec 1' are the same as those of the facsimile signal detecting codec 1 in the first embodiment described above. However, the frame synchronizing signal generating section 13' and the frame pull in processing section 16' are different from those of the first embodiment described above.

Meanwhile, the speech signal coding section 21, the frame multiplexing section 23, the speech signal decoding section 24 and the frame demultiplexing section 17 of the speech codec 2' are the same as those of the speech codec 2 in the first embodiment described above, but the frame synchronizing signal generating section 22' and the frame pull in processing section 25' of the speech codec 2' are different from those in the first embodiment described above.

In particular, the frame synchronizing signal generating section 13' generates a timing signal Tim1-a which is basically used to encode a facsimile signal while the frame synchronizing signal generating section 22' generates another timing signal Tim2-a which is basically used to encode a speech signal. However, the period of a frame generated from the frame synchronizing signal generating section 13' and the period of a frame generated from the frame synchronizing signal generating section 22' are set so as to present a ratio in integral number between them, and accordingly, the two frame synchronizing signal generating sections 13' and 22' receive the timing signals Tim2-a and Tim1-a (a speech frame timing signal and a facsimile frame timing signal) from each other so that the periods of them for generation of frames may be synchronized with each other.

Meanwhile, the frame pull in processing section 16' is constructed such that it extracts a synchronizing bit from received data and applies required forward protection to effect frame pull in processing. When synchronism is established, it notifies the FAX signal decoding section 15 as well as the selector 4, the echo canceller 5 and the frame pull in processing section 25' of the speech codec 2' of the establishment of synchronism as a signal (synchronism establishment notifying signal) FAX-SYNC. Then, after synchronism is established, it outputs a timing signal Tim1-b at predetermined intervals to the facsimile signal decoding section 15, the frame demultiplexing section 17 and the frame pull in processing section 25' of the speech codec 2'.

On the other hand, the frame pull in processing section 25' is constructed such that it extracts a synchronizing bit from received data and applies required forward protection to effect frame pull in processing. When synchronism is established, it notifies the speech signal decoding section 24 as well as the frame pull in processing section 16' of the facsimile signal detecting codec 1' of the establishment of synchronism by way of a signal (synchronism establishment notifying signal) SPEECH-SYNC. Then, after the establishment of synchronism, it outputs a timing signal Tim2-b at predetermined intervals to the speech signal decoding section 24, the frame demultiplexing section 26 and the frame pull in processing section 16' of the speech codec 2'.

Thus, when synchronism is entered by the frame pull in processing section 16' or 25' of the module 1' or 2', a synchronizing timing signal based on the synchronism is supplied to the frame pull in processing section 16' or 25' of the other module 2' or 1' on the waiting side. The frame pull in processing section 16' or 25' of the module 2' or 1' on the waiting side thus performs hunting of a synchronization pattern based on the received synchronizing timing signal. It effects, at a point in time when a pull out condition of the module which has issued the synchronizing timing signal is detected, switching between modules immediately when synchronism is established with a pull in stage number set smaller than the number of protection stages for the pull in condition from a condition in which synchronism is not entered.

In particular, the frame periods of the facsimile signal detecting codec 1' and the speech codec 2' are set either equal to each other or to values equal to a frame period of a particular module individually multiplied by integral numbers. Further, upon transmission, the facsimile side frame synchronizing signal generating section 13' is synchronized with a speech frame timing signal or the speech side frame synchronizing signal generating section 22' is synchronized with a facsimile frame timing signal so that the periods of generation of frames of the facsimile signal detecting codec 1' and the speech codec 2' may be synchronized with each other. It is to be noted that, in the present embodiment, the frame period of the speech codec 2' is set equal to twice the frame period of the facsimile signal detecting codec 1' as seen from FIGS. 9(a), 9(b) and 10.

On the other hand, upon reception, when synchronism is entered with either of the facsimile signal detecting codec 1' and the speech codec 2', a frame timing and a multi-frame timing based on the synchronism are delivered to the opposing module on the waiting side as a timing signal Tim1-b or Tim2-b and a framing signal (SPEECH SYNC or FAX SYNC).

Further, during waiting, hunting of a synchronization pattern is performed based on a frame timing and a multi-frame timing transmitted thereto. The modules on the waiting side thus perform the following operation at a point in time when a pull out condition of the module which has delivered the frame timing and the multi-frame timing is detected.

In particular, the waiting side modules perform switching between them immediately when synchronism is established with a pull in stage number set smaller than the number of protection stages for pull in from a condition wherein synchronism is not entered.

By the way, the speech codec 2' and the facsimile signal detecting codec 1' use synchronizing flag bits constructed in such configurations as shown in FIGS. 6(a) and 6(b), similarly as in the speech codec 2 and the facsimile signal detecting codec 1 of the embodiment described hereinabove, respectively. However, in the first embodiment, the speech frame period may be greater than twice the period of the fax frame of FIG. 6(b) such as 12 μs.

It is to be noted that, in the synchronism establishing apparatus in the second embodiment, the pull in protection stage number on the self frame side in a condition wherein synchronism is established with the opposing side is set to forward two stages at the speech codec 2' and to a forward one stage at the facsimile signal detecting codec 1'. The synchronism establishing apparatus is similar in other respects to the synchronism establishing apparatus of the first embodiment described hereinabove.

Also it is to be noted that the pull in stage numbers are set smaller than the protection stage number for pull in from a condition wherein synchronism is not entered.

In the synchronism establishing apparatus of the construction described above, the frame periods of the facsimile signal detecting codec 1' and the speech codec 2' are first set either equal to each other or to values equal to a frame period of a particular codec (module) individually multiplied by integral numbers.

Further, the frame generation periods are synchronized with each other on the transmitter side, and a pull in operation is performed, on the receiver side, by means of both of the facsimile signal detecting codec 1' and the speech codec 2'.

Then, when synchronism is entered on the receiver side either with the facsimile signal detecting codec 1' or with the speech codec 2', a notification of a timing based on the synchronism is supplied to the speech codec 2' or the facsimile signal detecting codec 1' on the other waiting side.

In particular, a notification of either a facsimile frame timing and a facsimile multi-frame timing (the two signals are denoted collectively by Tim1-b in FIGS. 4 and 5) or a speech frame timing and a speech multi-frame timing (the two signals are denoted collectively by Tim2-b in FIGS. 4 and 5) is issued.

The speech codec 2' or the facsimile signal detecting codec 1' which is the module on the waiting side having received the notification performs hunting of a synchronization pattern based on the frame timing and the multi-frame timing of the notification.

Further, the module on the waiting side immediately effects, at a point in time when a pull out condition of the codec which has issued the notification of the timings is detected, switching to the other module if synchronization is established already with a predetermined pull in stage number.

In this manner, where, in a system which includes a combination of two or more modules of different types having independent synchronization establishing means and alternatively switches an operating module when necessary to effect transmission of a signal, the synchronizing establishing apparatus is constructed such that, when synchronism is entered with any of the modules, a notification of a timing based on the synchronism is delivered to the other module in the waiting side, and then at a point of time when a pull out condition of the module which has issued the notification of the timing is detected, switching between the modules is effected immediately when synchronism is established with a pull in stage number set smaller than the protection stage number for pull in from a condition wherein synchronism is not entered, the following advantage is achieved.

In particular, with the synchronism establishing apparatus according to the second embodiment described above, the time required upon starting of switching can be decreased remarkably compared with a pull in time of the conventional synchronism establishing apparatus. If this is shown in a figure, it corresponds to a saved time of the interval $\tau 2$ indicated at B in FIG. 12(c).

It is also possible to take such a configuration that a synchronizing bit of the speech codec 2' is positioned immediately next to a synchronizing bit of the facsimile side. By this means, occurrence of an interval of time (1 multi-frame interval at the maximum) which occurs when the phases and periods of the facsimile signal detecting codec 1' and the speech codec 2' cannot be specified can be prevented. As a result, the interval of time which occurs when the phases and periods cannot be specified can be kept within such a range in which it can be ignored as a transmission time for one bit.

Since the interval of time which occurs when the phases and periods cannot be specified can be kept within the range in which it can be ignored, also media-free transmission, which is a technical subject in speech processing at present, can be realized.

It is to be noted that it is naturally possible to construct a synchronism establishing apparatus by a combination of the synchronizing establishing apparatus of the first and second embodiments described above, and the synchronism establishing apparatus of the construction can achieve the advantages of both of the first and second embodiments.

Further, while, in the first and second embodiments, two function modules are described above and they are separated into different blocks, in the case of such an application that, for example, a synchronism establishing apparatus is used to switch between two kinds of coding processes, the present invention can be applied so that the coding processes are achieved as two kinds of software function modules in a single block.

The present invention is not limited to the specifically described embodiments, and variations and modifications may be made without departing from the scope of the present invention.

What is claimed is:

1. A synchronism establishing method for a system which includes a combination of two or more modules of different types having independent synchronism establishing means, the modules including at least one master side module and at least one slave side module, the synchronism establishing method selectively switching an operating one of said modules to effect transmission of a signal through a selected module, the signal having a succession of information frames, and the modules responding to different frame patterns, with synchronism being established by a predetermined number of protection stages, each protection stage including at least one of said information frames, wherein, when the master side module detects establishment of synchronism with its frame pattern, the master side module delivers a notification of establishment of synchronism to the slave side module or modules, and each of the slave side module or modules operates such that if the slave side module is in a condition wherein synchronism is established and the slave side module is in a pulled in phase when the synchronism establishment notification is received from the master side module, the slave side module puts its synchronizing operation into a waiting mode, in which, even if a number of abnormal synchronization patterns greater than the number of protection stages are detected, the slave side module does not determine a pull out condition and maintains the pulled in phase, and if the slave side module detects a notification from the master side module that a pull out condition has occurred, and the slave side module determines a normal synchronization pattern at several stages just prior to such reception of the notification, wherein the number of the stages is smaller than the number of protection stages for pull in from any condition wherein synchronism is not entered other than during a waiting mode, then the slave side module resumes its processing operation.

2. A synchronism establishing apparatus for a system which includes a combination of two or more modules of different types having independent synchronism establishing means, the modules including at least one master side module and at least one slave side module, the synchronism establishing method selectively switching an operating one of said modules to effect transmission of a signal through a selected module, the signal having a succession of information frames, and the modules responding to different frame patterns, with synchronism being established by a predetermined number of protection stages, each protection stage including at least one of said information frames, comprising:

frame pull in processing means provided in each of said modules and serving as said synchronism establishing means when a signal is to be decoded;

synchronism establishment notifying means for delivering, when establishment of synchronism is detected by said frame pull in processing means the master side module, a notification of the establishment of synchronism of the master side module from said frame pull in processing means of said master side module to said frame pull in processing means of the slave side module;

mode changing means provided for each of the slave side module or modules for changing, when the slave side module is in a condition wherein synchronism is established when the notification of establishment of synchronism is received from said master side module, the synchronizing operation of said frame pull in processing means of the slave side module into a waiting mode;

phase maintaining means provided for each of the slave side module or modules for determining, even when a number of abnormal synchronization patterns greater than the number of protection stages are detected after the transition to the waiting mode by said mode changing means, no pull out condition and maintaining a pulled in phase; and processing operation resuming means provided for each of the slave side module or modules for determining, when said frame pull in processing means of the slave side module detects a notification from the master side module that a pull out condition has occurred, the slave side module determines a normal synchronization pattern at several stages just prior to the reception of the notification, in which the number of the stages is smaller than the number of protection stages for pull in from any condition wherein synchronism is not entered other than during the waiting mode, then the slave side module resumes its processing operation.

3. A synchronism establishing apparatus as claimed in claim 2, wherein said frame pull in processing means of each of the slave side modules normally supervises to check whether or not a synchronization pattern appears with the pulled in phase when said frame pull in processing means remains in the waiting mode.

4. A synchronism establishing apparatus as claimed in claim 2, wherein said master side module demodulates a modulated signal other than a modulated speech signal, and at least one of the slave side module or modules demodulates a compressed coded speech signal.

5. A synchronism establishing apparatus as claimed in claim 4, wherein said master side module demodulates a modulated facimile signal.

6. A synchronism establishing apparatus as claimed in claim 2, wherein said master side module demodulates a compressed coded speech signal, and the slave side module or modules demodulate a modulated signal or signals other than a modulated speech signal.

7. A synchronism establishing apparatus as claimed in claim 6, wherein at least one of the slave side module or modules demodulates a modulated facsimile signal.

8. A synchronism establishing method for a system which includes a combination of two or more modules of different types having independent synchronism establishing means, the synchronism establishing method selectively switching an operating one of said modules to effect transmission of a signal to a second combination of two or more modules on a receiving side, wherein said modules have frame periods set so as to present a ratio in integral number between them, and the frame periods are synchronized on the transmission side, and on the receiving side, when synchronism is entered with any of said modules, a notification of a timing based on the synchronism is delivered to each of the other module or modules on the receiving side, and in each receiving side module, hunting of a synchronization pattern is performed based on the timing and then, when a pull out condition of an operative one of the receiving side modules is detected, the receiving side module is switched immediately if synchronism is established with a waiting receiving side module with a number of pull in frame periods which is set smaller than the number of frame periods for pull in from a condition wherein synchronism is not entered.

9. A synchronism establishing method as claimed in claim 8, wherein the frame periods of said modules are set to an equal period.

10. A synchronism establishing method as claimed in claim 8, wherein the frame periods of said modules are set equal to the frame period of a particular one of said modules multiplied by an integral number.

11. A synchronism establishing apparatus for a system which includes a combination of two or more modules of different types having independent synchronism establishing means, the modules including at least one master side module and at least one slave side module, the synchronism establishing apparatus selectively switching an operating one of said modules to effect transmission of a signal to a selected one of a second combination of two or more modules on a receiving side, the signal having a succession of information frames of a predetermined period, comprising:

frame synchronizing signal generating means provided for each of said modules on the transmitting side and used upon coding of a signal;

synchronizing means provided for each of said modules on the transmitting side for causing a timing signal to be communicated between said frame synchronizing signal generating means of said modules on the transmitting side to synchronize the frame periods on the transmitting side;

frame pull in processing means provided for each of said modules on the receiving side and used as said synchronism establishing means upon decoding of a pull in signal, the pull in signal including a predetermined number of information frames; and notifying means provided for each of said modules on the receiving side for delivering, when synchronism is entered with said frame pull in processing means of a first receiving side module, a synchronizing timing signal based on the synchronism to said frame pull in processing means of a second receiving side module or modules;

wherein said frame pull in processing means of each of said second receiving side module or modules effects hunting of a synchronization pattern based on the synchronizing timing signal and effects, when a pull out condition of the first receiving side module which has delivered the synchronizing timing signal is detected, switching of the first receiving side module immediately if synchronism is established with a number of pull in frames set smaller than a number of protection frames for pull in from a condition wherein synchronization is not entered.

12. A synchronism establishing apparatus as claimed in claim 11, wherein said modules on the transmitting side include a third module which modulates and transmits a signal other than a speech signal and a fourth module which converts a speech signal into a compressed coded signal and transmits the compressed coded speech signal, and said modules on the receiving side include said first module for demodulating the modulated signal from said third module, and said second module for decoding the compressed coded speech signal from said fourth module.

13. A synchronism establishing apparatus as claimed in claim 12, wherein said third module modulates and transmits a facsimile signal, and said module demodulates the modulated facsimile signal from said third module.

* * * * *

UNITED STATES PATENT AND TRADEMARK OFFICE
CERTIFICATE OF CORRECTION

PATENT NO. : 5,313,462  Page 1 of 2
DATED : May 17, 1994
INVENTOR(S) : Fujino, et al.

It is certified that error appears in the above-indentified patent and that said Letters Patent is hereby corrected as shown below:

Column 3, Line 51, "stages-needed" should be --stages needed--.

Column 3, Line 53, "mode-is" should be --mode is--.

Column 3, Line 64, "-The" should be --The--.

Column 3, Line 65, "cludes-frame" should be --cludes frame--.

Column 4, Line 23, "determining-that" should be --determining that--.

Column 4, Line 25, "module--;" should be --module--.

Column 5, Line 36, "manner" should be --manner,--.

Column 12, Line 37, "2'" should be --2,--.

UNITED STATES PATENT AND TRADEMARK OFFICE
CERTIFICATE OF CORRECTION

PATENT NO. : 5,313,462
DATED : May 17, 1994
INVENTOR(S) : Fujino, et al.

It is certified that error appears in the above-indentified patent and that said Letters Patent is hereby corrected as shown below:

Column 12, Line 39, "1'" should be --1,--.

Column 13, Line 51, "detecting" should be --detecting codec 1--.

Signed and Sealed this

Tenth Day of January, 1995

*Attest:*

BRUCE LEHMAN

*Attesting Officer*     *Commissioner of Patents and Trademarks*